J. OLTZ.
SASH-CORD FASTENER.
No. 177,655. Patented May 23, 1876.
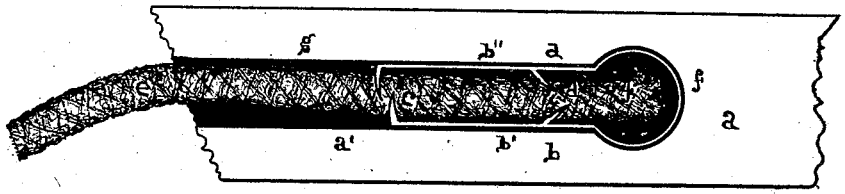
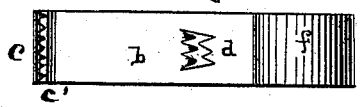
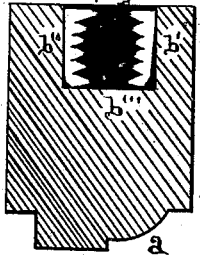

UNITED STATES PATENT OFFICE.

JOHN OLTZ, OF ITHACA, NEW YORK.

IMPROVEMENT IN SASH-CORD FASTENERS.

Specification forming part of Letters Patent No. 177,655, dated May 23, 1876; application filed March 27, 1876.

*To all whom it may concern:*

Be it known that I, JOHN OLTZ, of Ithaca, Tompkins county, New York, have invented a Window-Sash-Cord Fastener or Clutch, which I have set forth in the following specification, reference being had to the accompanying drawings.

My invention consists of a sheet-metal toothed clutch, designed to grasp the cord, with no knot in the sash end of the cord. It conforms in shape to the usual form of the excavations made in sashes—that is, to the rounded pit made by a bit or auger, and to the channel or groove above it. Both the elasticity of the sides of my clutch and the forcing it in the sash close the teeth on the cord, and thus hold the cord fast, as will be hereinafter more fully described and definitely claimed.

Figure 1 is a view of the edge of a portion of a window-sash with my device in it. Fig. 2 is a detached side view; and Fig. 3 is a sectional view of a window-sash, showing the upper end of my clutch and the teeth there.

In Fig. 1, $a$ is the sash, and $a'$ is the usual excavation made in the sash, consisting of the groove from the top of the sash down to any convenient place in the edge of the sash, where it terminates in the usual enlarged rounded cavity; and $b$ is my clutch or fastener, made of sheet metal, with arms or sides $b'$ and $b''$, having teeth $c$ at the upper ends, and at least one set of teeth, $d$, toward the rounded portion of the clutch. These teeth are for the purpose of penetrating the sash-cord $e$ sufficiently to hold the cord fast without a knot in the rounded cavity; but, if preferred, a knot can be tied and lie in the rounded extremity. Yet my design is to use no knots, as they use up much cord, and are difficult to adjust.

In Fig. 2 the side of my fastener is seen to have the teeth $c$ on one side to lap over the teeth on the other side at $c'$, as the side $b'$, Fig. 1, is shorter than the other side; and teeth $d$ are made by punching the sheet metal through toward the cord on each side. Several sets of these teeth, if desirable, can be made in the sides of the fastener, though one is sufficient for ordinary weights.

In Fig. 3 the end teeth $c$ are seen more clearly. The sides $b'$ $b''$ are, on the inside edges, bent slightly inward, in order that they may be slid into the cavity made in the sash, and this slight wedge shape aids in so doing. These teeth $c$ can be of any number, size, and shape; but to have the outer ones long and the middle ones shorter, as seen in the figure, seems to me best.

To put my clutch or fastener into the sash, the cord $e$ is put in, as seen in Fig. 1, and the bent or beveled edges are slid into the groove $a'$ and cavity, Fig. 1.

To take the fastener and cord out of the sash, draw on the cord, (seen to the left in Fig. 1,) and this raises the end out of the groove. Bear down on this end and the rounded end $f$ springs out of the sash. Thus it is easily put in and easily taken out.

The advantages and uses of my invention are apparent to those skilled in the art to which it appertains.

I claim—

The metallic clutch or fastener $b$, with elastic spring sides $b'$ and $b''$, and provided with teeth or projections $c$ and $d$ and curved extremity $f$, in combination with the sash $a$, the same constructed and operating substantially as and for the purpose set forth.

JOHN OLTZ.

Witnesses:
    S. J. PARKER,
    A. M. LUCAS.